(12) United States Patent  (10) Patent No.: US 7,869,587 B2
Kim  (45) Date of Patent: Jan. 11, 2011

(54) METHOD AND APPARATUS FOR CANCELING ACOUSTIC ECHO IN A MOBILE TERMINAL

(75) Inventor: Gang-Youl Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1463 days.

(21) Appl. No.: 11/269,894

(22) Filed: Nov. 9, 2005

(65) Prior Publication Data

US 2006/0098810 A1  May 11, 2006

(30) Foreign Application Priority Data

Nov. 9, 2004 (KR) .................... 10-2004-0091084

(51) Int. Cl.
  *H04M 9/08* (2006.01)
(52) U.S. Cl. ................................. 379/406.14
(58) Field of Classification Search ............ 379/406.14
  See application file for complete search history.

(56) References Cited

U.S. PATENT DOCUMENTS 5,598,468 A * 1/1997 Ammicht et al. ....... 379/406.08

6,035,048 A * 3/2000 Diethorn ................... 381/94.3
2006/0007872 A1* 1/2006 Liu ........................... 370/286

FOREIGN PATENT DOCUMENTS

KR 2002-0036542 5/2002
KR 2002-0057183 7/2002

* cited by examiner

*Primary Examiner*—Alexander Jamal
(74) *Attorney, Agent, or Firm*—Roylance, Abrams, Berdo and Goodman, L.L.P.

(57) ABSTRACT

An acoustic echo canceller (AEC) apparatus for canceling an echo signal input to a microphone in a mobile terminal. In the AEC apparatus, a first analysis filter bank divides a signal received from the microphone into a plurality of subband signals, and classifies the subband signals into high-band signals and low-band signals according to a predetermined reference. A second analysis filter bank divides a far-end user's signal into a plurality of subband signals, and outputs particular subband signals being lower than or equal to a reference band to an adaptive filter bank. The adaptive filter bank receives the subband signals output from the second analysis filter bank, and generates estimated echo signals for the individual subbands. An adder calculates differences between the low-band signals among the subband signals output from the first analysis filter bank and the estimated echo signals output from the adaptive filter bank. A synthesis filer bank synthesizes signals output from the adder according to subband, and converts the synthesized signals into a time-domain signal.

13 Claims, 8 Drawing Sheets

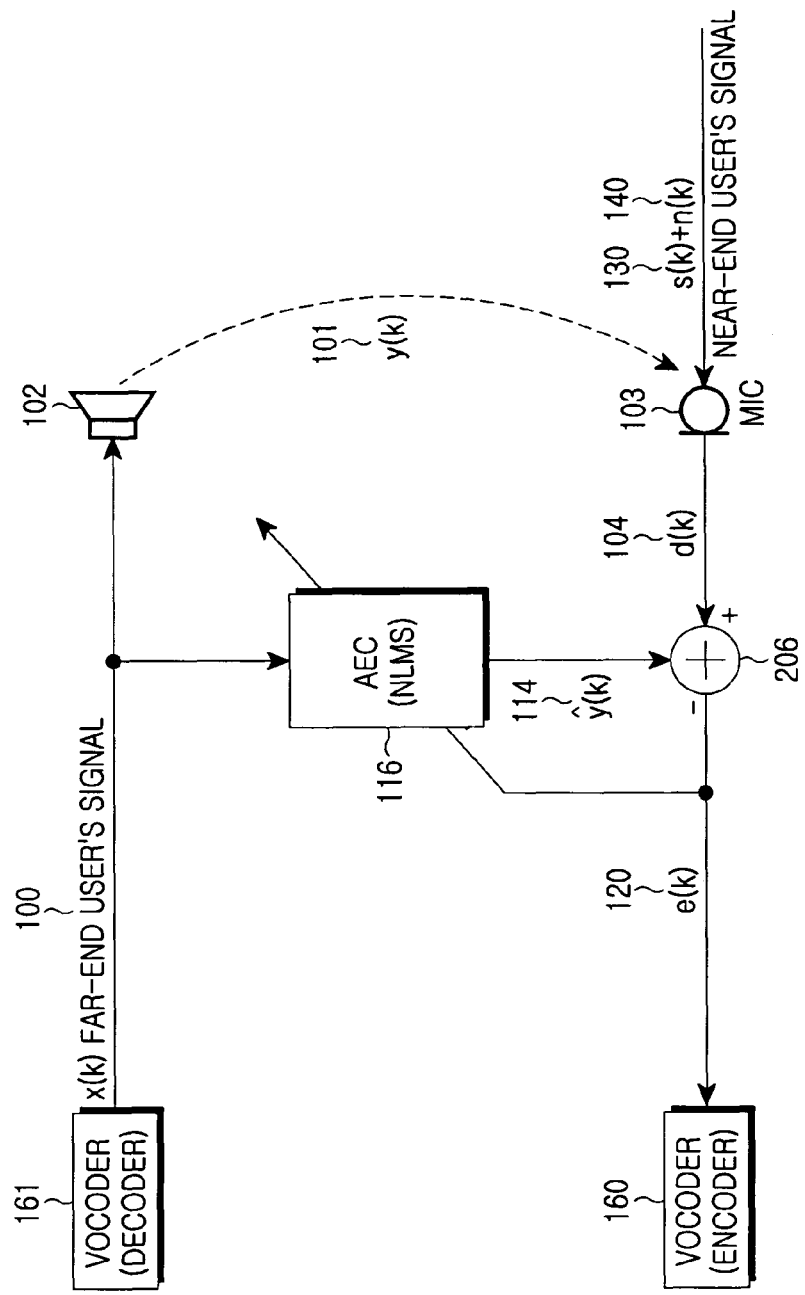
FIG. 1
(CONVENTIONAL)

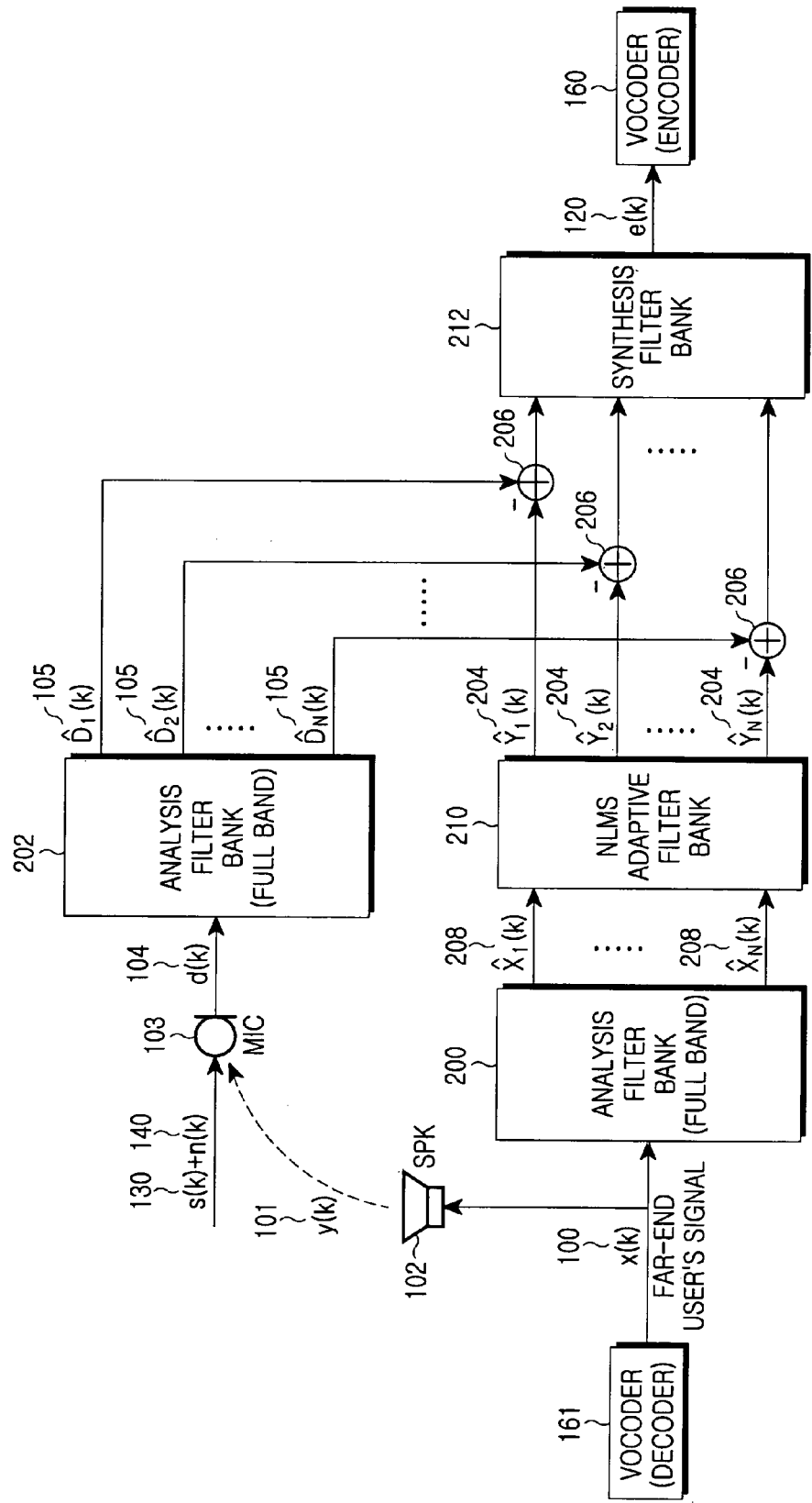
FIG.2
(CONVENTIONAL)

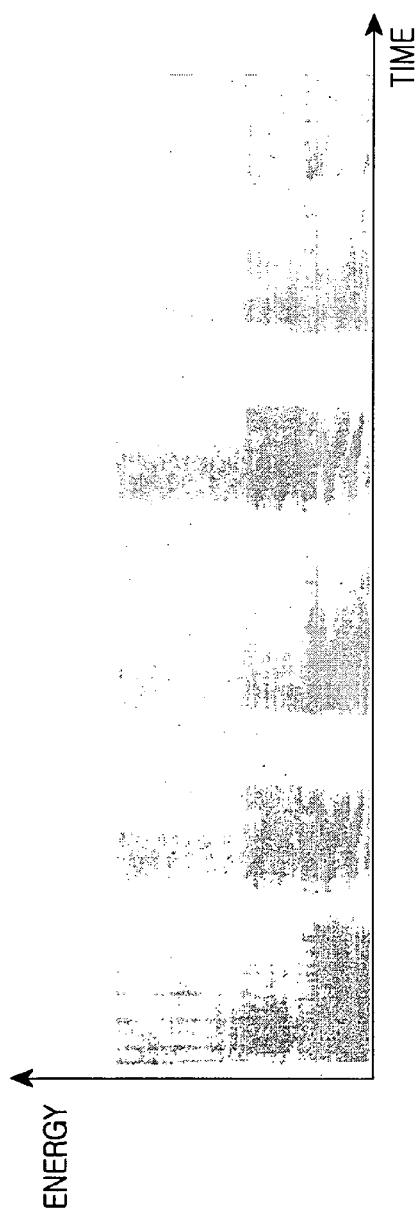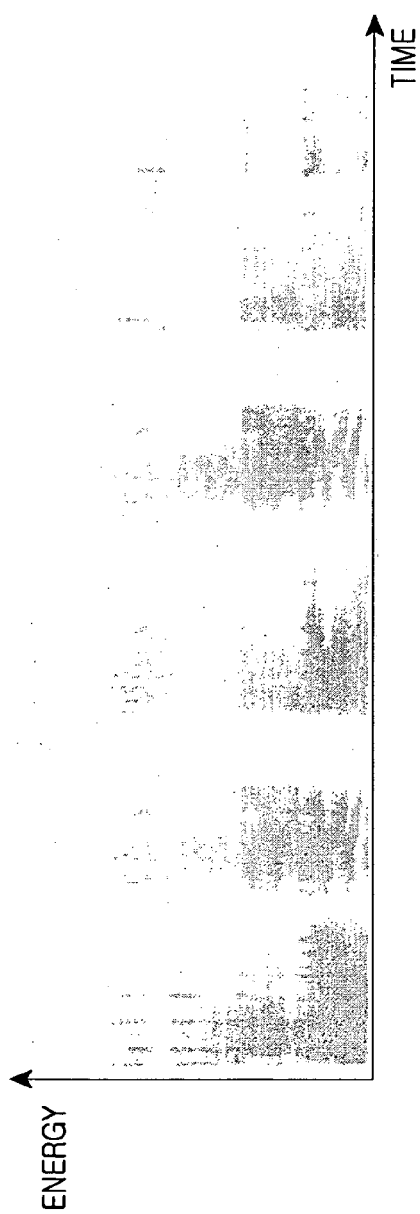

METHOD AND APPARATUS FOR CANCELING ACOUSTIC ECHO IN A MOBILE TERMINAL

PRIORITY

This application claims the benefit under 35 U.S.C. §119 (a) of a Korean Patent Application Serial No. 2004-91084 filed in the Korean Intellectual Property Office on Nov. 9, 2004, the entire contents of which is hereby incorporated by reference.

BACKGROUND OF THE INVENTION

1. Field of the Invention

The present invention relates generally to an acoustic echo cancellation method and apparatus. In particular, the present invention relates to a method and apparatus for canceling echo signals generated during a call in a mobile terminal of a mobile communication system.

2. Description of the Related Art

In general, the term "acoustic echo" refers to a phenomenon in which a sound wave originated from a sound source is reflected by a surface of an object and returned to the sound source. An example of the acoustic echo, which can be often found in the everyday life, includes a natural echo with single reflection. A direct sound is the opposite of the acoustic echo. The term "direct sound" refers to a directly heard sound without being reflected by the surface of an object. In other words, the acoustic echo indicates a reflected sound that arrives about 0.05 or longer second behind the direct sound in terms of the hearing sense. Therefore, the echo sound and the direct sound are heard with a time difference. In the place with multiple reflecting surfaces, such as a room and a cave, the reflection is repeated several times in various directions, generating a complex echo sound. This is an example of a multiple reflection echo, also known as a reverberation.

The modern society is making a rapid progress to the information society. In the course of progressing toward the information society, communication technology plays a very important role. With the development of communication technology, the communication system is evolving from a wired communication system into a wireless communication system. In order to provide a convenient call environment, there has been proposed a hands-free technique in which a user talks over the phone using a microphone and a speaker instead of the earpiece and mouthpiece. The hands-free technique is applicable to a car hands-free phone, a remote conference system, a speaker-phone system, an International Mobile Telecommunication 2000 (IMT-2000) phone, and so on.

In the communication system where voice communication between the user and the communication device is performed through the speaker and the microphone, it is necessary to take into consideration the fact that a part of the voice or acoustic sound output from the speaker is input to the microphone. Therefore, the acoustic echo component should be taken into account to provide a smooth call. In a full-duplexing hands-free voice communication system, if the acoustic echo component is not appropriately canceled, a far-end user hears back his/her own voice after a lapse of a predetermined time, together with a voice of a near-end user. In other words, the user is inconvenienced by an echo phenomenon during a call.

The acoustic echo occurs because a far-end user's signal output from the speaker is input to the microphone via an acoustic echo path, together with a noise, and then transmitted back to the far-end user. As a result, the far-end user receives the undesired echo signal along with the near-end user's signal. This phenomenon is called a howling phenomenon in communication engineering. An influence of the echo signal increases with intensity and delay time of the echo signal.

The acoustic echo path of the echo signal undergoes a frequent change with the passage of time when a mobile terminal operates not only in a normal voice call mode but also in a video conference mode or a speaker phone mode. For example, the acoustic echo path undergoes a change even when a participant of the conference moves his/her head, arm and shoulder during the video conference.

Therefore, the current mobile terminal uses an acoustic echo canceller (AEC) to cancel the echo phenomenon. The AEC estimates an echo component of a far-end user's signal using an adaptive algorithm, and subtracts the estimated echo component from a signal input to the microphone.

The adaptive algorithm is used because a voice signal, which is the typical input signal of the AEC, has a very high inter-sample correlation and a non-static statistical characteristic. Therefore, the AEC must be implemented using the adaptive algorithm in which filter coefficients undergo a change according to the surrounding environment.

Therefore, the AEC uses an adaptive filtering technique that estimates an echo signal by estimating a time-varying acoustic echo path. The adaptive filtering technique popularly uses a normalized least mean square (NLMS) algorithm for simple structure and stable convergence.

FIG. 1 is a block diagram illustrating a structure of an AEC apparatus and its peripheral circuit included in a mobile terminal. With reference to FIG. 1, a description will now be made of a structure and operation of an AEC apparatus with an NLMS algorithm included in the current mobile terminal.

The peripheral circuit includes a speaker 102 for outputting a received far-end user's signal x(k) 100 and a microphone 103 for converting a near-end user's signal s(k) 130 and a noise signal n(k) 140 into an electrical voice signal. In addition, the microphone 103 receives an output signal y(k) 101 of the speaker 102 for the far-end user's signal x(k) 100, together with the near-end user's signal s(k) 130 and the noise signal n(k) 140.

For simplicity, FIG. 1 illustrates the speaker 102 for receiving the far-end user's signal x(k) 100 decoded by a vocoder 161, the microphone 103 for receiving the near-end user's signal s(k) 130, the background noise signal n(k) 140 and an echo component of the far-end user's signal x(k) 100, and converting the received signals into electrical signals, an AEC 116, an adder 206 for calculating a difference between an output signal of the AEC 116 and an output signal of the microphone 103, and a vocoder 160 for encoding a residual echo signal e(k) 120 output from the adder 206.

The speaker 102, as described above, outputs the received far-end user's signal x(k) 100. The microphone 103 receives the near-end user's signal s(k) 130, the background noise n(k) 140 of the near-end user, and an echo signal y(k) 101 for the far-end user's signal x(k) 100, which is provided through an acoustic echo path from the speaker 102. The microphone 103 converts the received signals into a single electrical digital signal d(k) 104.

The AEC 116 uses an NLMS algorithm-based adaptive filter. The AEC 116 generates an estimated echo signal $\hat{y}(k)$ 114 from the far-end user's signal x(k) 100, and outputs the estimated echo signal $\hat{y}(k)$ 114 to the adder 206. The adder 206 calculates a residual echo signal e(k) 120 by subtracting the estimated echo signal $\hat{y}(k)$ 114 from the electrical digital signal d(k) 104 output from the microphone 103, and outputs the residual echo signal e(k) 120 to the vocoder 160, and also outputs the residual echo signal e(k) 120 to the AEC 116 to control an estimation capability of the adaptive filter.

The adder 206 outputs the residual echo signal e(k) 120 by subtracting the estimated echo signal ŷ(k) 114 output from the AEC 116 from the signal d(k) 104 output from the microphone 103. The signal d(k) 104 output from the microphone 103 can be expressed as $$d(k)=s(k)+n(k)+y(k) \quad (1)$$

The AEC 116 generates the estimated echo signal ŷ(k) 114 by using the far-end user's signal x(k) 100 as a reference input signal in accordance with Equation (2) below.

$$\hat{y}(k)=X^T(k)W(k) \quad (2)$$

In Equation (2), $X^T(k)$ denotes a transpose matrix of the far-end user's signal x(k) 100, and W(k) denotes a coefficient of the adaptive filter. The AEC 116 which uses the adaptive algorithm must estimate an echo component and adjust the filter coefficient every time such that a difference, or an error, between the estimated echo component ŷ(k) 114 and the actual echo component becomes small.

The adder 206 calculates an average power of the residual echo signal e(k) 120 by subtracting the ŷ(k) 114 calculated using Equation (2) from the d(k) 104 in accordance with Equation (3) below.

$$e(k)=d(k)-\hat{y}(k) \quad (3)$$

Using Equation (4) and Equation (5) below, a new echo component is estimated by calculating a coefficient W(k) of an adaptive filter of the AEC 116 which uses the residual echo signal e(k) 120 calculated by Equation (3).

$$W(k+1) = W(k)\frac{\mu X(k)e(k)}{|X(k)|^2} \quad (4)$$

$$X(k) = [x(k), x(k-1), \cdots, x(k-n)] \quad (5)$$

In Equation (4), W(k+1) denotes an adaptive filter coefficient updated to estimate a new echo component, and is a value determined taking into account the type of the mobile terminal like the slide type and the folder type. In addition, μ denotes an adapt rate of a filter. Equation (5) expresses, as a column matrix, values of the far-end user's signal x(k) 100 with which the adaptive filter estimates a direction signal. In Equation (5), 'n' denotes the number of taps of the adaptive filter, which is a length of a path for the echo signal.

In FIG. 1, a vocoder is divided into the vocoder 160 for processing transmission signals and the vocoder 161 for processing reception signals. In practice, however, the vocoder can be implemented with a single chip in the mobile terminal such that it can process both the transmission signals and the reception signals. For convenience, it is shown in FIG. 1 that the vocoder 160 for processing transmission signals and the vocoder 161 for processing reception signals are separated from each other.

The conventional AEC applied to the mobile terminal shows an excellent echo cancellation capability in a normal call with a short acoustic echo path. However, when the mobile terminal operates in the video conference mode or the speaker phone mode, a length of the acoustic echo path is increased. The increase in length of the acoustic echo path increases a length 'n' of the adaptive filter. As a result, it can be noted from Equation (2) and Equation (4) that the echo component is calculated by estimating the longer time delay, increasing the total calculations.

The apparatus and method for canceling echo components without dividing one signal according to frequency band has been described so far with reference to FIG. 1. Next, with reference to FIG. 2, a description will now be made of an apparatus and method for canceling acoustic echo by dividing signals input to an AEC into several subbands.

FIG. 2 is a block diagram illustrating a structure of a general AEC apparatus using subband coding, included in a mobile terminal. With reference to FIG. 2, a description will now be made of a structure and operation of the general AEC apparatus. In FIG. 2, a vocoder is divided into a vocoder 161 for outputting a decoded far-end user's signal x(k) 100 and a vocoder 160 for encoding a residual echo signal e(k) 120. In practice, however, the vocoder can be implemented with a single chip in the mobile terminal such that it can process both the transmission signals and the reception signals. For convenience, it is shown in FIG. 2 that the vocoder 160 for processing transmission signals and the vocoder 161 for processing reception signals are separated from each other.

The term "subband coding" refers to a method for coding digital signals using an analysis-by-synthesis (ABS) technique. The subband coding divides an input signal into regular-interval frequency components and performs band division coding thereon. For the band division, polyphase filter banks are used. Each of analysis filter banks 200 and 202 analyzes signals according to frequency band using a filter bank that enables design of a perfect reconstruction (PR) filter for preventing aliasing which may occur in the course of dividing an input signal into several subband signals and converting them into frequency-domain signals.

A synthesis filter bank 212 receives individual subband signals output from the analysis filter bank 200, which analyzes the received far-end user's signal x(k) 100 and divides the analyzed signal into subband signals, and restores the analyzed signals into an original time-domain signal.

A method for canceling acoustic echo using the subband coding method will now be described with reference to FIG. 2.

FIG. 2 illustrates a structure of an AEC apparatus using subband coding and its peripheral circuit included in a mobile terminal. The peripheral circuit includes a speaker 102 for outputting the received far-end user's signal x(k) 100 and a microphone 103 for converting a near-end user's signal s(k) 130 and a noise signal n(k) 140 into an electrical voice signal. In addition, the microphone 103 receives an output signal y(k) 101 of the speaker 102 for the far-end user's signal x(k) 100, together with the near-end user's signal s(k) 130 and the noise signal n(k) 140.

The far-end user's signal x(k) 100 is input to the analysis filter bank 200, and the analysis filter bank 200 converts the far-end users signal x(k) 100 into a frequency-domain signal, divides the frequency-domain signal into regular-interval subband signals X̂(k) 208, and outputs the subband signals X̂(k) 208 to an NLMS adaptive filter bank 210.

The adaptive filter bank 210 with an NLMS algorithm receives the subband signals X̂(k) 208 and outputs estimated echo signals Ŷ(k) 204 generated by estimating echo components according to subband, to adders 206.

As described above, the microphone 103 receives the output signal y(k) 101 of the speaker 102 for the far-end user's signal x(k) 100, provided through an echo path denoted by a dotted line, together with the near-end user's signal s(k) 130 and the noise signal n(k) 140, and converts the received signals into an electrical digital signal d(k) 104.

The analysis filter bank 202 converts the input signal d(k) 104 into frequency-domain signals and analyzes the frequency-domain signals, in order to perform subband coding for dividing the input signal d(k) 104 into regular-interval subbands.

The far-end user's signal x(k) 100 is input to the analysis filter bank 200, without passing through the echo path, and the analysis filter bank 200 analyzes the far-end user's signal x(k) 100 and outputs the analyzed far-end user's signals 208 to the NLMS adaptive filter bank 210. The NLMS adaptive filter bank 210 has different adaptive filter coefficients each having the same filter length, for each individual band. For example, if an adaptive filter with 1024-tap filter coefficients is divided into four bands, the NLMS adaptive filter bank 210 requires 256 taps for a filter coefficient length for each of the bands, and requires 256*4=1024 adaptive filter coefficients. However, the filter bank, as it performs per-frame processing, is less in calculation than the general filtering method that performs per-sample processing.

The estimated echo signals Ŷ(k) 204 output from the adaptive filter bank 210 are input to the adders 206, and the adders 206 calculate differences between subband signals D̂(k) 105 generated by converting the signal d(k) 104 into frequency-domain signals in the analysis filter bank 202 using Equation (3) and the estimated echo signals Ŷ(k) 204, and output the difference signals to the synthesis filter bank 212.

The synthesis filter bank 212 performs synthesis for restoring frequency-domain signals for each band, to which the adaptive filter algorithm is applied, into time-domain signals.

A residual echo signal e(k) 120 output from the synthesis filter bank 212 is input to the vocoder 160 for encoding. The AEC apparatus using the subband coding receives the digital signal 104 that the microphone 103 generates by converting the far-end user's signal x(k) 100, the echo signal y(k) 101 output from the speaker 102 of the mobile terminal, and the noise signal n(k) 140, converts the received digital signal 104 into frequency-domain signals, and divides the frequency-domain signals into subband signals. The AEC apparatus applies the individual subband signals to the adaptive algorithm, and synthesizes the individual subband signals in the synthesis filter bank 212. As a result, the synthesis filter bank 212 outputs the residual echo signal e(k) 120 to the vocoder 160.

Unlike the general NLMS algorithm that performs per-sample calculation, the AEC apparatus of FIG. 2 performs per-frame calculation which decreases calculations and increases convergence speed, making it possible to efficiently cancel an echo signal having a long echo path.

A conventional subband coding-based AEC apparatus converts digital signals into frequency band signals, divides the frequency band signals according to subband, and applies them to the adaptive filter. Thus, the AEC apparatus includes the adaptive filter bank 210 in which the individual subbands have the same filter coefficient length and require the same amount of calculations.

Herein, a band of voice signals is divided into several subbands, and the subbands lower than or equal to a predefined reference will be referred to as "low bands" while the subbands higher than the predefined reference will be referred to as "high bands." A definition of the low band part and the high band part is subject to change.

The reference for the low bands and high bands is not an absolute value but a relative value. That is, a $0^{th}$ subband is a low band with respect to a $1^{st}$ subband, and the $1^{st}$ subband is a high band with respect to the $0^{th}$ subband.

A description will now be made of energy distribution and the amount of information in the high band part and the low band part. A 4-KHz band for satisfying the general Nyquist condition will be established as a full band.

Herein, the full band is divided into four bands, and the amount of information and energy for each individual band is illustrated in FIG. 3 and Table 1. FIG. 3 is a graph illustrating energy distribution for each individual band of a voice signal, given through 4-band subband coding analysis.

Actually, due to the characteristics of the voice signal, most information and energy are distributed over the low band part, and less information and energy are distributed over the high band part.

TABLE 1

| | Band | | | |
|---|---|---|---|---|
| | 0~1000 Hz | 1001~2000 Hz | 2001~3000 Hz | 3001~4000 Hz |
| Average power (signal) | −34.37 dB | −50.59 dB | −59.99 dB | −62.39 dB |
| Total power (signal) | −30.06 dB | −44.94 dB | −55.45 dB | −57.14 dB |

It can be understood from FIG. 3 and Table 1 that the most information and energy of the voice signal are concentrated upon the relatively low bands of a first band of 0~1000 Hz and a second band of 1001~2000 Hz.

A high-frequency signal, which is subject to considerable variation, is difficult to estimate using an adaptive filter, compared with a low-frequency signal. Therefore, even implementation of adaptive filtering cannot fully cancel the residual echo signal. It can be noted from FIG. 3 and Table 1 that the first and second bands, which are lower bands, are greater in energy level than the third and fourth bands, which are higher bands.

A conventional Enhanced Variable rate Codec (EVRC) vocoder for a mobile terminal adjusts a bit rate of an input voice signal to one of a full rate, a half rate and an ⅛ rate.

Therefore, if a rate lower than the full rate, that is, the half rate or the ⅛ rate, is allocated, it is inefficient to process signals over the full band. In a mobile terminal environment, a high-capacity memory must be implemented in the mobile terminal to cancel the echo components. Further, because it is difficult to allocate the large amount of calculations to the AEC apparatus, the optimized calculation and memory should be implemented in the mobile terminal.

In the speaker phone mode, the mobile terminal increases in both volume of the speaker and gain of the microphone. As a result, a far-end user's voice output from the speaker is input to the gain-increased microphone directly or after being reflected by the wall or object, and then transmitted back to the far-end user. In this case, the number of paths for the echo signals reflected by the wall or object increases, and in order to decrease the number of the echo paths, the number of adaptive filter taps of the NLMS algorithm must be reduced.

Generally, the AEC is designed to be optimized for a path delay of about 64 ms~128 ms, and includes an adaptive filter having 512~1024 taps for a digital signal having a sampling frequency. However, the mobile terminal has difficulty in performing the complex calculations due to limited memory and battery life.

SUMMARY OF THE INVENTION

It is, therefore, an object of the present invention to provide an acoustic echo canceller (AEC) apparatus which is adaptive to various modes without increasing calculations in a mobile terminal for a mobile communication system, and to provide a method for controlling the same.

It is another object of the present invention to provide an AEC apparatus for efficiently canceling time-varying echo components in a mobile terminal for a mobile communication system, and a method for controlling the same.

It is further another object of the present invention to provide an apparatus and method for adaptively canceling echo components without increasing the number of taps of an adaptive filter in a mobile terminal for a mobile communication system.

It is yet another object of the present invention to provide an apparatus and method for efficiently canceling echo components without increasing the memory capacity in a mobile terminal for a mobile communication system.

According to an exemplary aspect of the present invention, there is provided a method for canceling an echo signal for a signal input to a microphone in a mobile terminal with an acoustic echo canceller (AEC). The method comprises the steps of dividing a far-end user's signal into a plurality of subband signals, estimating an echo signal using particular subband signals being lower than or equal to a reference value among the subband signals, dividing a signal received from the microphone into a plurality of subband signals, and classifying the subband signals into high-band signals and low-band signals according to the predetermined reference value, generating a residual echo signal by subtracting the estimated echo signal from the individual low-band signals, and synthesizing the residual echo signal.

According to another exemplary aspect of the present invention, there is provided an acoustic echo canceller (AEC) apparatus for canceling an echo signal for a signal input to a microphone in a mobile terminal. The AEC apparatus comprises a first analysis filter bank for dividing a signal received from the microphone into a plurality of subband signals, and classifying the subband signals into high-band signals and low-band signals according to a predetermined reference. A second analysis filter bank for dividing a far-end user's signal into a plurality of subband signals, and outputting particular subband signals being lower than or equal to a reference band to an adaptive filter bank; the adaptive filter bank for receiving the subband signals output from the second analysis filter bank, and generating estimated echo signals for the individual subbands. An adder for calculating differences between the low-band signals among the subband signals output from the first analysis filter bank and the estimated echo signals output from the adaptive filter bank, and a synthesis filer bank for synthesizing signals output from the adder according to subband, and converting the synthesized signals into a time-domain signal are provided.

BRIEF DESCRIPTION OF THE DRAWINGS

The above and other exemplary objects, features and advantages of the present invention will become more apparent from the following detailed description when taken in conjunction with the accompanying drawings in which like reference numerals will be understood to refer to like parts, components and structures, where:

FIG. 1 is a block diagram illustrating a structure of an AEC apparatus and its peripheral circuit included in a mobile terminal;

FIG. 2 is a block diagram illustrating a structure of a general AEC apparatus using subband coding, included in a mobile terminal;

FIGS. 7A and 7B are graphs illustrating a comparison between the proposed AEC apparatus and the conventional AEC apparatus in terms of AEC capability.

DETAILED DESCRIPTION OF EXEMPLARY EMBODIMENTS

Figure 3:
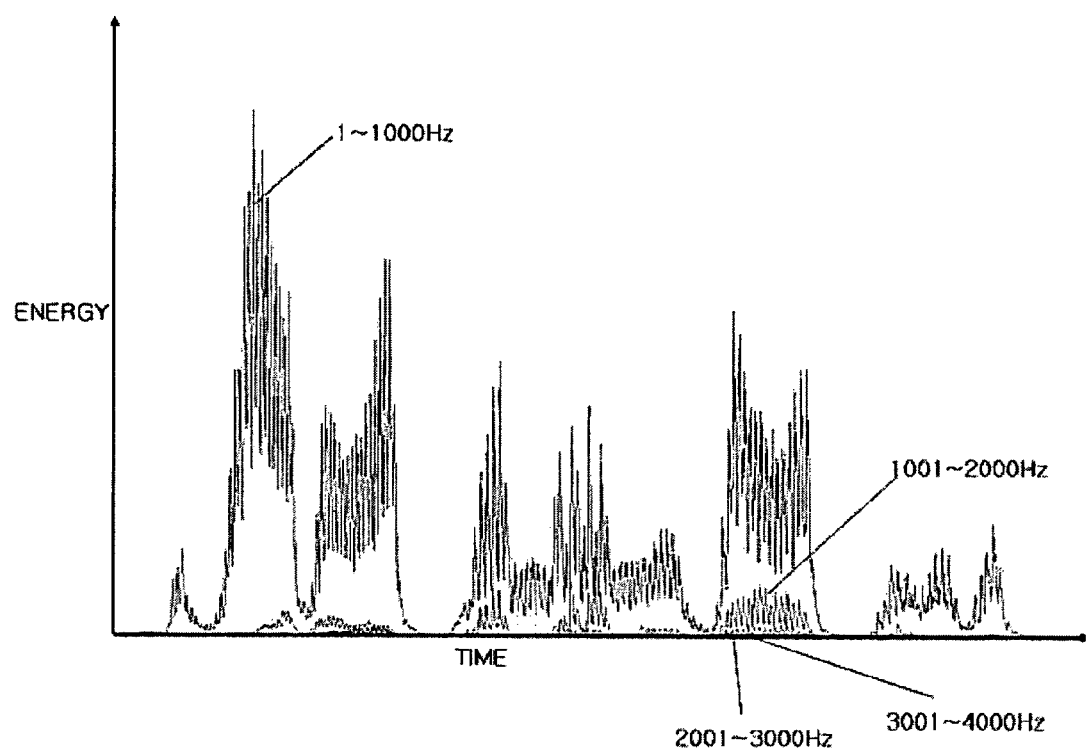
FIG. 3 is a graph illustrating energy distribution for each individual band of a voice signal, given through 4-band subband coding analysis.

Exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Figure 4:
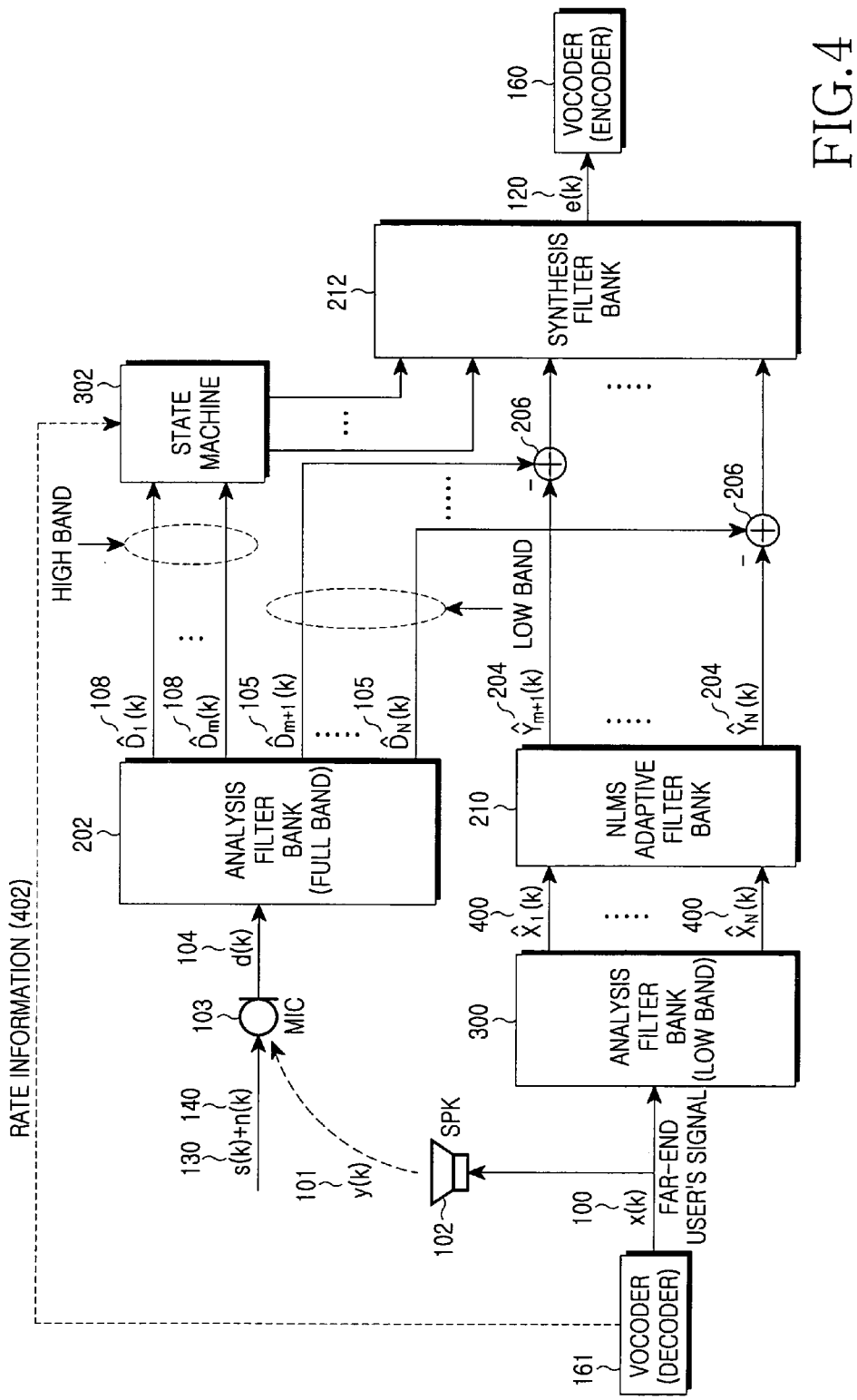
FIG. 4 is a block diagram illustrating a structure of an acoustic echo canceller (AEC) apparatus using subband coding according to an embodiment of the present invention.

FIG. 4 is a block diagram illustrating a structure of an acoustic echo canceller (AEC) apparatus using subband coding according to an embodiment of the present invention, and a detailed description thereof will be made below.

In FIG. 4, a vocoder is divided into a vocoder 161 for outputting a decoded far-end user's signal x(k) 100 and a vocoder 160 for encoding a residual echo signal e(k) 120. In practice, however, the vocoder can be implemented with a single chip in the mobile terminal such that it can process both the transmission signals and the reception signals. For convenience, it is shown in FIG. 4 that the vocoder 160 for processing transmission signals and the vocoder 161 for processing reception signals are separated from each other.

The subband coding divides an input signal into regular-interval frequency components and performs band division coding thereon. For the band division, polyphase filter banks are used. The polyphase filter banks are generally required in order not to perform unnecessary calculations in the filtering process, and according to an exemplary implementation are included in both an analysis filter bank and a synthesis filter bank.

An analysis filter bank 202 analyzes signals according to frequency band using a filter bank that enables design of a perfect reconstruction (PR) filter for preventing aliasing which may occur in the course of dividing an input signal into several subband signals and converting them into frequency-domain signals.

In an exemplary embodiment of the present invention, the analysis filter bank 202 divides an input signal d(k) 104 into four subbands of 0~1000 Hz, 1001~2000 Hz, 2001~3000 Hz, and 3001~4000 Hz, for a better understanding of the present invention. However, the number of subbands is subject to change.

In the following description of the exemplary embodiment, the subbands of 0~1000 Hz, 1001~2000 Hz, 2001~3000 Hz, and 3001~4000 Hz will be referred to as first band, second band, third band and fourth band, respectively.

The AEC apparatus of FIG. 4 includes a speaker 102 for outputting the received far-end user's signal x(k) 100 and a microphone 103 for converting a near-end user's signal s(k) 130 and a noise signal n(k) 140 into an electrical voice signal. In addition, the microphone 103 receives an output signal y(k) 101 of the speaker 102 for the far-end user's signal x(k) 100, together with the near-end user's signal s(k) 130 and the noise signal n(k) 140.

The electrical digital signal d(k) 104 converted by the microphone 103 is input to the analysis filter bank 202 for subband coding. The analysis filter bank 202 performs a signal analysis operation of dividing the input signal into subband signals and converting them into frequency-domain signals.

The far-end user's signal x(k) 100 is input to a low-band analysis filter bank 300, without passing through the echo path, and the analysis filter bank 300 converts the input signal 100 into frequency-domain signals for each individual band.

Herein, the analysis filter bank 202 for analysis-filtering the full band of the input signal d(k) 104 will be referred to as a first analysis filter bank 202, and the analysis filter bank 300 for analyzing only the low band of the far-end user's signal x(k) 100 will be referred to as a second analysis filter bank 300.

The second analysis filter bank 300 converts the far-end user's signal x(k) 100 into frequency-domain signals, analyzes the frequency-domain signals, and outputs the analyzed signals $\tilde{X}(k)$ 400 to an NLMS adaptive filter bank 210. The NLMS adaptive filter bank 210 has different adaptive filter coefficients each having the same filter length, for each individual band.

The estimated echo signals Ŷ(k) 204 output from the adaptive filter bank 210 are input to adders 206, and the adders 206 subtract output signals of the first analysis filter bank 202 therefrom and output the subtraction results to a synthesis filter bank 212.

As described above, according to an exemplary implementation of the present invention, the speaker 102 outputs the received far-end user's signal x(k) 100, and the microphone 103 receives the near-end user's signal s(k) 130, the background noise signal n(k) 140 of the near-end user, and the echo signal y(k) 101 for the far-end user's signal x(k) 100, which is provided through an acoustic echo path from the speaker 102, and converts the received signals into digital signal d(k) 104.

The digital signal d(k) 104 output from the microphone 103, generated by converting the echo signal y(k) 101, the near-end user's signal s(k) 130 and the background noise signal n(k) 140, is input to the first analysis filter bank 202. The first analysis filter bank 202 analyzes the signal d(k) 104 according to frequency band and divides the analyzed frequency-band signal into low-band signals and high-band signals. The low-band signals are input to the adders 206, and the adders 206 subtract the low-band signals from the estimated echo signals Ŷ(k) 204 output from the adaptive filter bank 210, and output the subtraction results to the synthesis filter bank 212.

The first analysis filter bank 202 converts the input signal d(k) 104 received from the microphone 103 into frequency-domain signals, analyzes the frequency-domain signals for all of the individual frequency bands, and outputs the high-band signals to a state machine 302. Herein, the high band indicates the fourth band, and the high band is subject to change when necessary.

The adders 206 subtract the output signals 105 of the first analysis filter bank 202 from the estimated echo signals 204 output from the adaptive filter bank 210, and output the subtraction results to the synthesis filter bank 212. The adaptive filter bank 210 applies the general NLMS adaptive filtering method to its input data, and outputs the estimated echo signals 204.

The first analysis filter bank 202 outputs the frequency-converted high-band signals 108 to the state machine 302. The state machine 302 determines a data processing method using bit rate information 402 received from the vocoder 161 and energy values for the individual bands.

Figure 5:
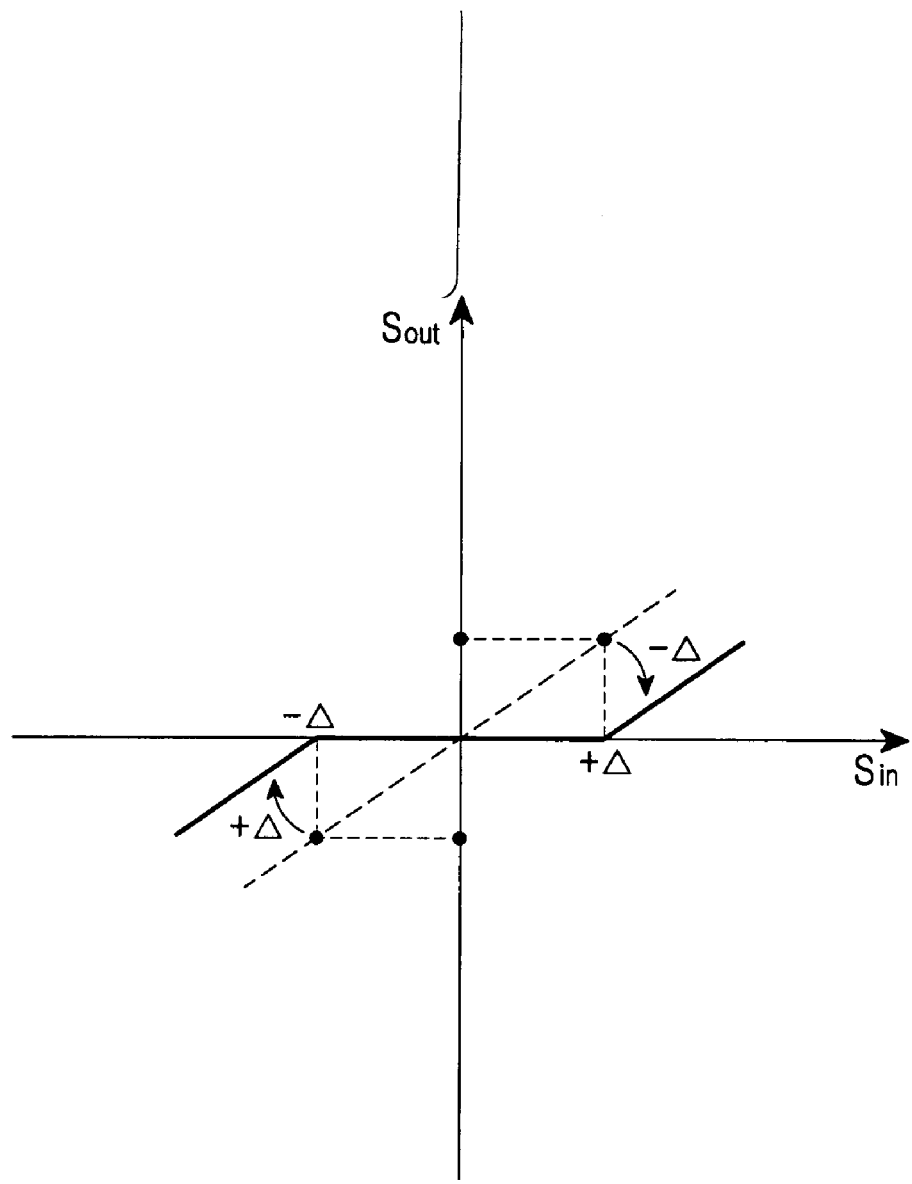
FIG. 5 is a graph illustrating a center clipping function applied to an embodiment of the present invention.

If the bit rate information 402 received from the vocoder 161 does not indicate the full rate, the AEC apparatus clears all of the signals input to the state machine 302 to output '0's. However, if the bit rate information 402 received from the vocoder 161 indicates the full rate, the AEC apparatus calculates energy values for the individual bands, and compares the energy values with a threshold. As a result of the comparison, the AEC apparatus uses a center clipping function of Equation (6) below for the data having a higher energy value, and outputs '0's for the signals having a lower energy value, and a description thereof will be made with reference to FIG. 5. FIG. 5 is a graph illustrating a center clipping function applied to an embodiment of the present invention.

$$S_{out} = \begin{cases} S_{in} + \Delta, & S_{in} < -\Delta \\ 0, & -\Delta \leq S_{in} \leq \Delta \\ S_{in} - \Delta, & \Delta < S_{in} \end{cases} \quad (6)$$

In Equation (6), Δ denotes a predetermined threshold, which can be determined during manufacturing of the mobile terminal or through a software program. In addition, $S_{in}$ denotes signals input to the state machine 302, and $S_{out}$ denotes output signals of the state machine 302.

In FIG. 5, the x-axis represents energy $S_{in}$ of signals input to the state machine 302, and the y-axis represents energy $S_{out}$ of signals output from the state machine 302.

For example, if energy $S_{in}$ of an input signal is less than $-\Delta (S_{in} < -\Delta)$, the state machine 302 outputs $S_{out} = S_{in} + \Delta$ to the synthesis filter bank 212. That is, because an excessive increase in level (energy) of the signals output from the first analysis filter bank 202 causes distortion, the state machine 302 decreases a level of its outputs by a predetermined threshold Δ if a level of the output signals is higher than a predetermined threshold. In contrast, if a level of input signals falls between +Δ and −Δ, indicating that the signals are so insignificant that they cannot affect the echo component, then the state machine 302 outputs '0's as shown in Equation (6).

Referring to FIG. 5, a curve represented by a dotted line indicates signals output from the state machine 302, to which Equation (6) is not applied, and a curve represented by a bold line indicates signals output from the state machine 302, to which Equation (6) is applied.

In this exemplary implementation of a method according to the present invention, the state machine 302 applies Equation (6) to its output signals according to the bit rate information 402 received from the vocoder 161.

According to the exemplary implementation, even through a value '0' is output instead of the high-band data, the low-band data is output through adaptive filtering in the adaptive filter bank 210. Therefore, an output signal generated by synthesizing the high-band data and the low-band data becomes a relatively natural signal.

Finally, the synthesis filter bank 212 synthesizes output signals of the adders 206 and output signals of the state machine 302 into a time-domain residual echo signal e(k) 120, and outputs the residual echo signal e(k) 120 to the vocoder 160 for encoding.

Figure 6A:
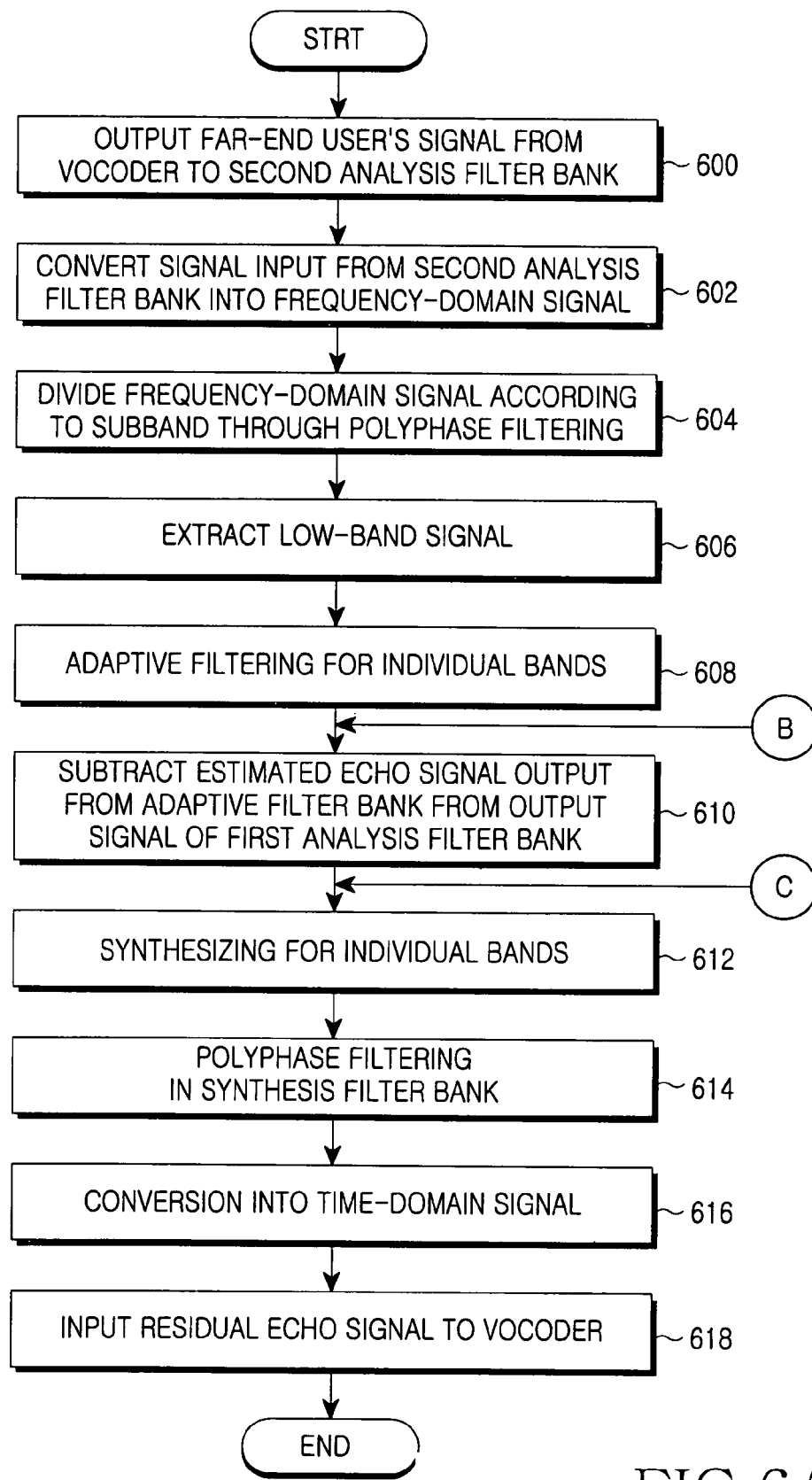
FIGS. 6A and 6B are flowcharts illustrating a process of canceling echo signals in a mobile terminal according to an embodiment of the present invention.
Figure 6B:
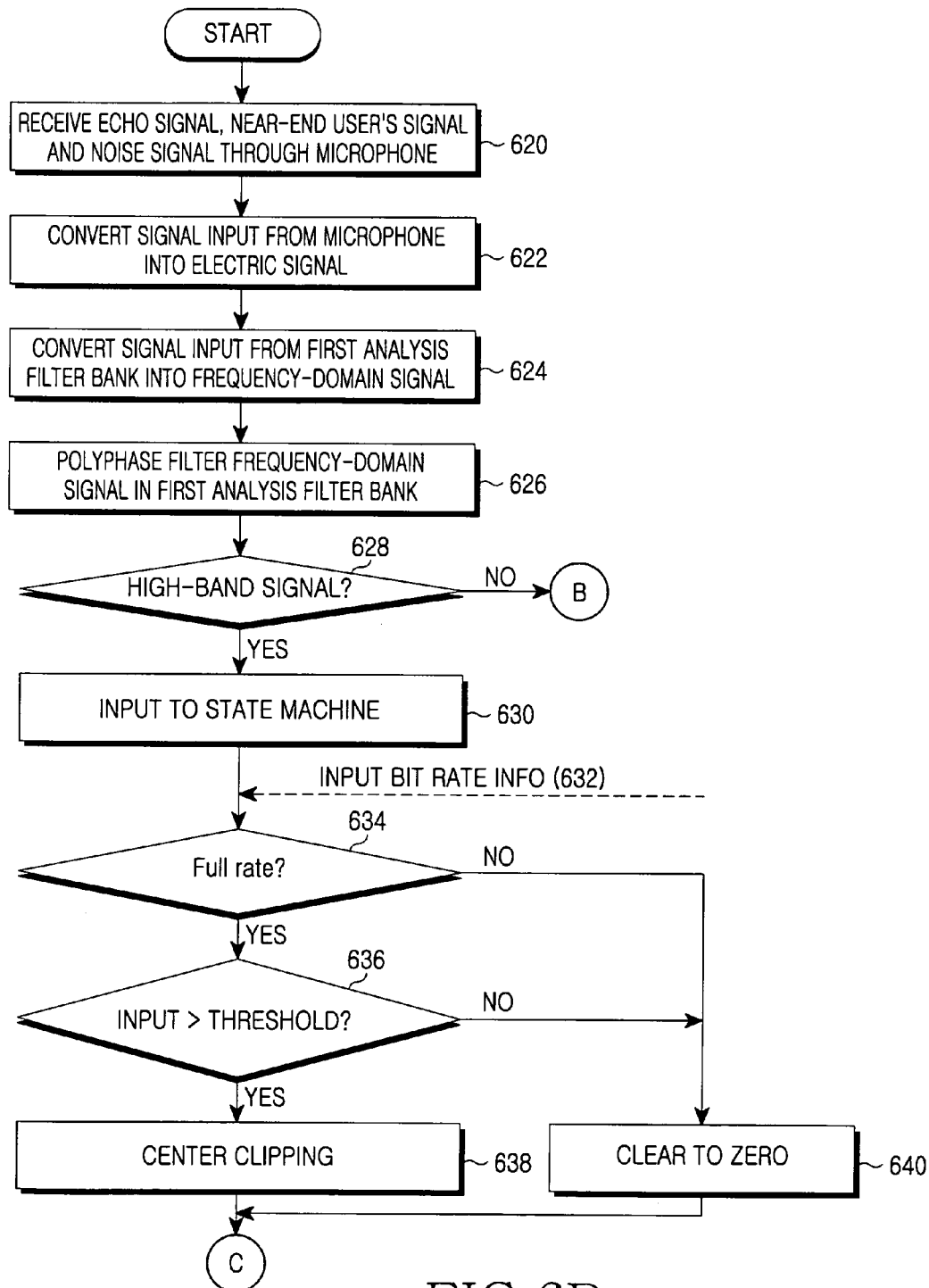

FIGS. 6A and 6B are flowcharts illustrating a process of canceling echo signals in a mobile terminal according to an embodiment of the present invention.

According to an exemplary implementation, FIGS. 6A and 6B are not independent of each other, and are simply separated from each other for convenience of description. That is, according to an exemplary implementation a process in step 600 of FIG. 6A of outputting a far-end user's signal 100 from a vocoder 161 to a second analysis filter bank 300 and a process in step 620 of FIG. 6B of receiving an echo signal y(k) 101, a near-end user's signal s(k) 130 and a noise signal n(k) 140 through a microphone 103 are performed essentially simultaneously.

In step 600, a vocoder 161 of a mobile terminal outputs a far-end user's signal 100 to a second analysis filter bank 300, and outputs the far-end user's signal 100 through a speaker 102. In step 620, an output signal 101 of the speaker 102 for the far-end user's signal 100 is input to a microphone 103, along with a near-end user's signal 130 and a noise signal 140.

In step 602, the second analysis filter bank 300 converts the received far-end user's signal 100 into frequency-domain signals. In step 604, the second analysis filter bank 300 divides the frequency-domain signals according to frequency band through polyphase filtering in order to reduce unnecessary calculations occurring in the coding process.

In step 606, the second analysis filter bank 300 extracts only the low-band signals from the individual subband signals, and outputs the extracted low-band signals to an adaptive filter bank 210. In step 608, the adaptive filter bank 210 performs adaptive filtering on input signals for the individual subbands, and outputs the filtering results to adders 206. In step 610, the adders 206 calculate differences between estimated echo signals 204 output from the NLMS adaptive filter bank 210 and output signals of the first analysis filter bank 202. In step 612, a synthesis filter bank 212 synthesizes the signals added in step 610 by the adders 206 and signals center-clipped in step 638 of FIG. 6B. The synthesis filter bank 212 performs polyphase filtering on the synthesized signals in step 614, and converts the filtering results back into a time-domain signal in step 616.

In step 618, the synthesis filter bank 212 outputs a residual echo signal e(k) 120 generated by converting the filtering results into the time-domain signal in step 616, to a vocoder 160. Then the vocoder 160 encodes the received residual echo signal e(k) 120.

A circled B between steps 608 and 610 and a circled C between steps 610 and 612 interwork with a circled B and a circled C of FIG. 6B, and a detailed description thereof will be made with reference to FIG. 6B.

With reference to FIG. 6B, a description will now be made of steps 620 through 640.

In step 622, the microphone 103 converts its input signals received in step 620 into an electrical signal, and outputs the electrical signal to the first analysis filter bank 202. The first analysis filter bank 202 converts its input signal into frequency-domain signals in step 624, and performs polyphase filtering on the frequency-domain signals in step 626 to prevent unnecessary calculations occurring in the general filtering process.

After performing the polyphase filtering in step 626, the first analysis filter bank 202 divides the filtering results into low-band signals and high-band signals in step 628. The low-band signals and the high-band signals are relative to each other, and a fourth band is defined as a high band herein.

If it is determined in step 628 that the signal polyphase-filtered by the first analysis filter bank 202 is a low-band signal, the routine proceeds to step 610. In step 610, the adders 206 calculate differences between the estimated echo signals 204 output from the adaptive filter bank 210 and output signals of the first analysis filter bank 202. However, if it is determined in step 628 that the signal polyphase-filtered by the first analysis filter bank 202 is a high-band signal, the first analysis filter bank 202 outputs the high-band signal to the state machine 302 in step 630.

After receiving the high-band signal in step 630, the state machine 302 receives bit rate information provided from the vocoder 161 in step 632, and determines in step 634 whether the a bit rate of a signal decoded in the vocoder 161 is a full rate, using the bit rate information. If it is determined in step 634 that a bit rate of the signal input to the state machine 302 is a full rate, the state machine 302 determines in step 636 whether its input signal exceeds a threshold in energy level. However, if it is determined in step 634 that the bit rate of the signal input to the state machine 302 is not the full rate, the state machine 302 clears the signals output to the synthesis filter bank 212 to '0' in step 640. However, if it is determined in step 636 that its input signal exceeds the threshold, the state machine 302 performs center clipping in step 638. Otherwise, if the input signal does not exceed the threshold, the state machine 302 clears the signals output to the synthesis filter bank 212 to '0' in step 640.

As described above, the output signals of the state machine 302 and the output signals of the adders 206 are input to the synthesis filter bank 212 and then synthesized for the individual subbands in step 612.

The signals synthesized in step 612 by the synthesis filter bank 212 are again subject to polyphase filtering by the synthesis filter bank 212 in step 614, and then converted back into a time-domain signal in step 616.

The residual echo signal e(k) 120 generated by converting the filtering results into the time-domain signal in step 616 is output to the vocoder 160. Then the vocoder 160 encodes the received residual echo signal e(k) 120.

With reference to FIGS. 7A and 7B, a description will now be made of a simulation result for acoustic echo cancellation according to an embodiment of the present invention.

FIGS. 7A and 7B are graphs illustrating a comparison between the AEC apparatus proposed by the present invention and the conventional AEC apparatus in terms of the simulation results obtained by performing acoustic echo cancellation based on a far-end user's signal and a near-end user's signal.

Specifically, FIG. 7A is a graph illustrating a frequency analysis of a residual echo signal e(k) 120 after cancellation of echo components according to the prior art, and FIG. 7B is a graph illustrating a frequency analysis of a residual echo signal e(k) 120 after cancellation of echo components according to an embodiment of the present invention. In FIGS. 7A and 7B, the horizontal axis represents a time domain, the vertical axis represents a frequency domain, and the color intensity represents an energy level of a voice signal.

Table 2 below shows a comparison in power between a residual echo signal generated by the conventional AEC apparatus and a residual echo signal generated by the AEC apparatus proposed by the present invention.

TABLE 2

| | Average power (signal) | Total power (signal) | Remarks |
| --- | --- | --- | --- |
| Prior art | −61.79 dB | −57.23 dB | |
| Invention | −61.83 dB | −57.25 dB | State machine is applied only for $4^{th}$ band which is the highest band. |

In Table 2, a residual echo signal used for the simulation has an average power of −39.06 dB and the total power of −36.15 dB, and has multiple echo paths having a delay of a maximum of 4000 samples.

The embodiment of the present invention has performed 4-band subband coding, and applied the state machine 302 only to the fourth band, which is the highest band among the four bands.

As can be understood from FIGS. 7A and 7B and Table 2, compared with the conventional AEC apparatus, The AEC apparatus according to exemplary implementations of the present invention shows improved echo cancellation performance by applying center clipping to the high-band signals.

As described above, generally the high-frequency signal is subject to instantaneous change even though it actually undergoes adaptive filtering, so it is difficult for the adaptive filter to estimate an echo signal for the high-frequency signal. Therefore, the AEC apparatus according to exemplary embodiments of the present invention does not perform adaptive filtering on the high-frequency component with less information, thereby contributing to a reduction in calculations. Compared with the conventional AEC apparatus that must include, in its memory, adaptive filter coefficients to be applied to all of necessary bands and their associated buffers. According to an exemplary implementation, AEC apparatus does not perform adaptive filtering on the high-frequency components with less information, making it possible to efficiently cancel echo signals in a mobile terminal having a limitation on memory capacity and calculation capability.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for canceling an echo signal for a signal input to a microphone in a mobile terminal with an acoustic echo canceller (AEC), the method comprising the steps of:
    (a) dividing a far-end signal into a plurality of subband signals;
    (b) estimating an echo signal using subband signals, the subband signals being lower than or equal to a reference value among the subband signals;

(c) dividing a signal received from the microphone into a plurality of subband signals, and classifying the subband signals into high-band signals and low-band signals according to the reference value;

(d) generating a residual echo signal by subtracting the estimated echo signal from the individual low-band signals;

(e) synthesizing the residual echo signal;

(f) gating on/off the high-band signals among the subband signals from the microphone according to bit rate information; and (g) synthesizing the high-band signals with the residual echo signal for each individual subband when outputting the high-band signals in the signal received from the microphone.

2. The method of claim 1, wherein if the bit rate information does not indicate a full rate, the high-band signals in the signal received from the microphone are cleared to zero (0).

3. The method of claim 1, wherein when outputting high-band signals in the signal received from the microphone, the high-band signals are subject to center clipping according to their energy values.

4. The method of claim 3, wherein the center clipping is performed using the following equation;

$$S_{out} = \begin{cases} S_{in} + \Delta, & S_{in} < -\Delta \\ 0, & -\Delta \leq S_{in} \leq \Delta \\ S_{in} - \Delta, & \Delta < S_{in} \end{cases}$$

where $\Delta$ denotes a predetermined threshold, $S_{in}$ denotes an input signal before the center clipping, and $S_{out}$ denotes an output signal after the center clipping.

5. The method of claim 1, wherein the step (a) comprises using polyphase filtering.

6. An acoustic echo canceller (AEC) apparatus for canceling an echo signal for a signal input to a microphone in a mobile terminal, the AEC apparatus comprising:

a first analysis filter bank for dividing a signal received from the microphone into a plurality of subband signals, and classifying the subband signals into high-band signals and low-band signals according to a reference;

a second analysis filter bank for dividing a far-end signal into a plurality of subband signals, and outputting particular subband signals being lower than or equal to a reference band to an adaptive filter bank;

the adaptive filter bank for receiving the subband signals output from the second analysis filter bank, and generating estimated echo signals for the individual subbands;

an adder for calculating differences between the low-band signals among the subband signals output from the first analysis filter bank and the estimated echo signals output from the adaptive filter bank;

a synthesis filer bank for synthesizing signals output from the adder according to subband, and converting the synthesized signals into a time-domain signal. and a state machine for gating on/off the high-band signals among the subband signals output from the first analysis filter bank according to bit rate information.

7. The AEC apparatus of claim 6, wherein the second analysis filter bank performs polyphase filtering when dividing signals according to subband.

8. The AEC apparatus of claim 6, wherein the synthesis filter bank synthesizes output signals of the adder and output signals of the state machine for the individual subbands.

9. The AEC apparatus of claim 6, wherein the state machine gates on the high-band signals exclusively if the bit rate information indicates a full rate.

10. The AEC apparatus of claim 6, wherein the state machine clears the high-band signals in the signal received from the microphone, to zero (0), if the bit rate information does not indicate the full rate.

11. The AEC apparatus of claim 6, wherein when outputting the received high-band signals, the state machine determines output signals according to energy values of the output signals for the individual subbands.

12. The AEC apparatus of claim 11, wherein the state machine outputs the high-band signals for the individual subbands using the following equation;

$$S_{out} = \begin{cases} S_{in} + \Delta, & S_{in} < -\Delta \\ 0, & -\Delta \leq S_{in} \leq \Delta \\ S_{in} - \Delta, & \Delta < S_{in} \end{cases}$$

where $\alpha$ denotes a predetermined threshold, $S_{in}$ denotes a signal input to the state machine, and $S_{out}$ denotes a signal output from the state machine.

13. The AEC apparatus of claim 9, wherein when outputting the received high-band signals, the state machine determines output signals according to energy values of the output signals for the individual subbands.

* * * * *